United States Patent [19]
Bull

[11] Patent Number: 5,865,109
[45] Date of Patent: Feb. 2, 1999

[54] DRIVE MECHANISM

[75] Inventor: Jeff W. Bull, Lombard, Ill.

[73] Assignee: Wilton Industries, Inc., Woodridge, Ill.

[21] Appl. No.: 956,210

[22] Filed: Oct. 22, 1997

[51] Int. Cl.$^6$ .............................. A47J 43/04; F26B 17/24; F26B 17/30

[52] U.S. Cl. .................................. 99/495; 34/58; 99/511; 210/360.1; 494/60; 494/84

[58] Field of Search .............................. 99/495, 511–513, 99/516, 479, 485; 34/8, 58; 210/360.1, 380.1, 784, 781; 494/11, 37, 46, 60, 62, 63, 84; 241/282.1; 426/443, 478, 601; 366/234, 601; 192/20, 5 R, 12 R, 71, 110 R, 153, 154

[56] References Cited

U.S. PATENT DOCUMENTS

| | | | |
|---|---|---|---|
| 3,885,321 | 5/1975 | Fouineteau | 34/58 |
| 4,144,286 | 3/1979 | Bingham | 99/495 X |
| 5,054,209 | 10/1991 | Koff | 210/360.1 |
| 5,490,453 | 2/1996 | Mackay | 494/36 X |
| 5,562,025 | 10/1996 | Bull et al. | 99/495 |

*Primary Examiner*—Timothy F. Simone
*Attorney, Agent, or Firm*—Rudnick & Wolfe

[57] ABSTRACT

A drive mechanism for relatively rotatable components such as a salad spinner comprising a bowl, a colander adapted to rest within the bowl, a lid for the bowl and colander, and a drive mechanism associated with the lid and operatively connected to the colander for rotating the colander relative to the bowl. The drive mechanism includes a handle and a drive gear associated with the handle rotatably attaching the turret to the lid, a pinion gear in driving engagement with the turret, and a clutch interposed between the pinion gear and the turret. The pinion gear meshes with the drive gear whereby movement of the handle in one direction engages the clutch to transmit movement to the turret for spinning of the colander in one direction. Movement of the handle in the opposite direction disengages the clutch. The clutch comprises a clutch housing and a clutch assembly receivable within the clutch housing. The clutch assembly includes a central hub, a plurality of drive pins, flexible arms connecting the drive pins to the central hub, and tensioning petals attached to the central hub for engagement with the turret. Recesses defined by the clutch housing receive the drive pins and these recesses slope inwardly toward the central hub. An engagement surface defined by the turret is received within the clutch housing and the petals operate to move the pins inwardly along the recesses and into driving engagement with the engagement surface when the handle is moved in one direction and outwardly along the recesses and out of driving engagement when the handle is moved in the opposite direction.

14 Claims, 5 Drawing Sheets

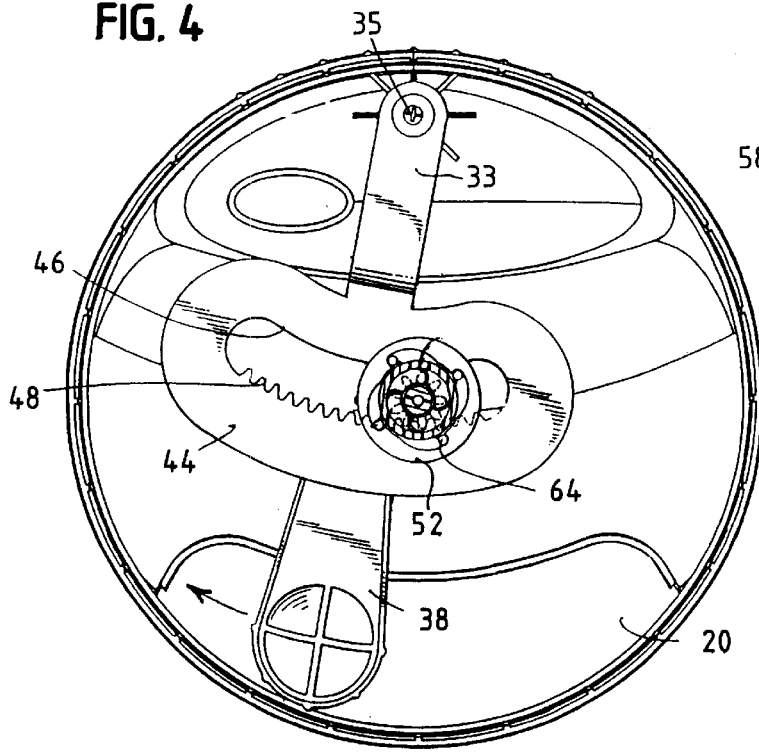
FIG. 4
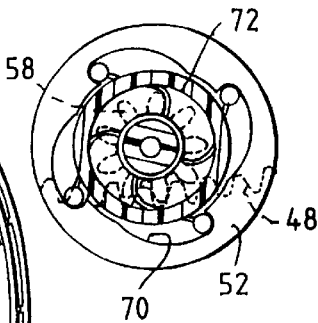
FIG. 5
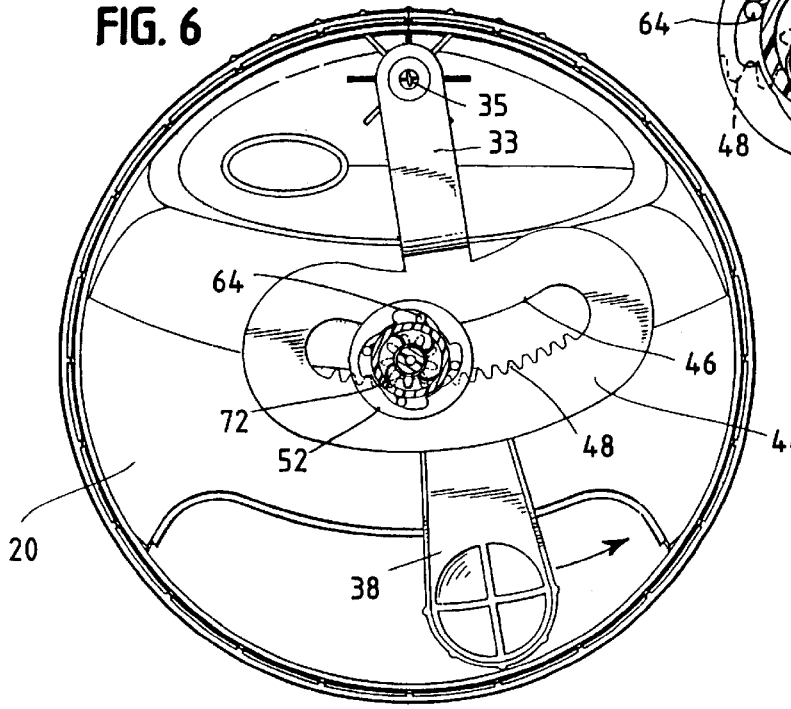
FIG. 6
FIG. 7

DRIVE MECHANISM

BACKGROUND OF THE INVENTION

This invention relates to a drive mechanism adaptable for use with various products such as a salad spinner useful in the making of salads. The concepts of the invention include as one feature an improved clutch means for a drive mechanism useful for a salad spinner and other products.

The invention will be described with reference to salad spinners which have typically consisted of an outer bowl with solid walls, and an inner perforated bowl adapted to nest within the outer bowl. Salad ingredients are located in the inner bowl, and a cover is provided for covering the salad. A drive means is provided for spinning the inner bowl relative to the outer bowl whereby water on the lettuce and/or other vegetables can be passed through the perforated bowl and collected in the outer bowl. A handle for operating the drive means is often associated with a lid placed over the bowls.

U.S. Pat. No. 5,562,025 discloses a salad spinner apparatus of the type including an outer bowl with solid walls, and an inner perforated bowl nested within the outer bowl. A lid is provided for covering the outer bowl and the lid includes drive means for spinning the inner bowl relative to the outer bowl.

The drive means specifically comprises clutch means for spinning the inner bowl in one direction, a handle positioned adjacent the periphery of the lid, and a drive arm extending from the handle to a pivotal connection adjacent the opposite side of the lid. The driving force is applied to a turret with drive elements at its outer periphery. When the lid is put into place, these drive elements are automatically placed in position for driving engagement with the inner perforated bowl. Accordingly, once the lid is in place, operation of the handle imparts driving movement to the inner bowl to achieve the spinning operation. Because of the clutch drive, the spinning movement may be repeated as often as desired.

The perforated inner bowl can be used as a colander while the outer bowl can be used as a serving bowl for the salad or for other similar purposes.

SUMMARY OF THE INVENTION

The drive mechanism for the salad spinner apparatus of this invention also includes a lid incorporating a clutch drive and reciprocally mounted handle. This structure imparts driving force to a turret which serves to spin a colander mounted for rotation within a bowl.

The drive mechanism particularly includes a drive gear associated with the handle and a pinion gear associated with a clutch means which is, in turn, drivingly connected to the turret. The pinion gear meshes with the drive gear whereby movement of the handle in one direction engages the clutch means to transmit movement to the turret for spinning of the colander in one direction. Movement of the handle in the opposite direction disengages the clutch means.

The clutch means comprises a clutch housing and a clutch assembly receivable within the clutch housing. The clutch assembly includes a central hub, a plurality of drive pins, flexible arms connecting the drive pins to the central hub, and tensioning petals attached to the central hub for engagement with the turret. Recesses defined by the clutch housing receive the drive pins and these recesses slope inwardly toward the central hub. An engagement surface defined by the turret is received within the clutch housing and the petals operate to move the pins inwardly along the recesses and into driving engagement with the engagement surface when the handle is moved in one direction, and outwardly along the recesses and out of driving engagement when the handle is moved in the opposite direction.

As will be apparent, the clutch means of the invention could be incorporated in a variety of products including other household items, toys, and the like.

BRIEF DESCRIPTION OF THE DRAWINGS

FIG. 4 is a bottom plan view of the spinner lid showing handle movement with the clutch disengaged;

FIG. 5 is a detail view of the clutch and clutch housing with the clutch disengaged;

FIG. 6 is a bottom plan view of the spinner lid showing handle movement with the clutch engaged; and FIG. 7 is a detail view of the clutch and clutch housing with the clutch engaged.

DETAILED DESCRIPTION OF THE INVENTION

Figure 1:
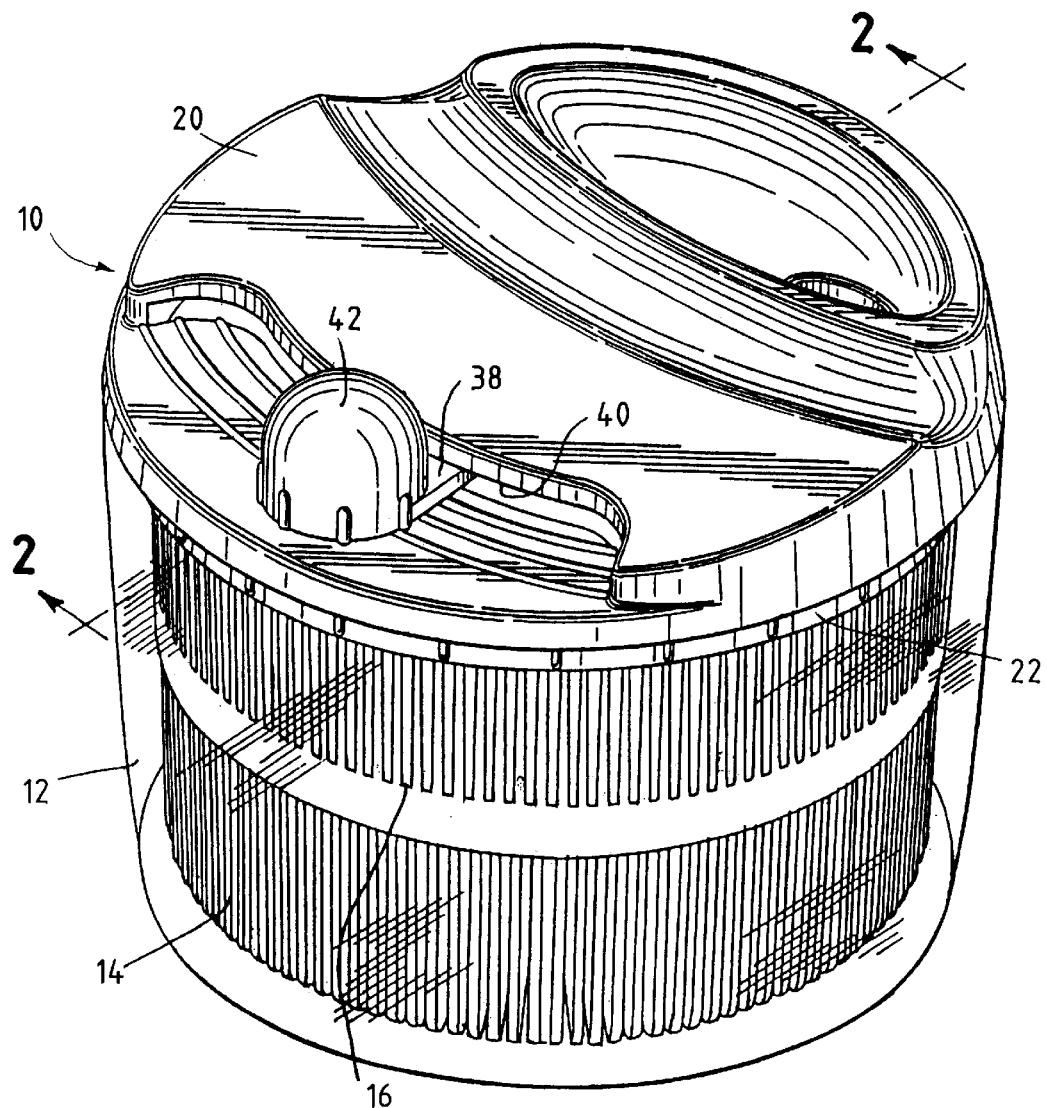
FIG. 1 is a perspective view of one form of salad spinner characterized by the features of the invention.
Figure 2:
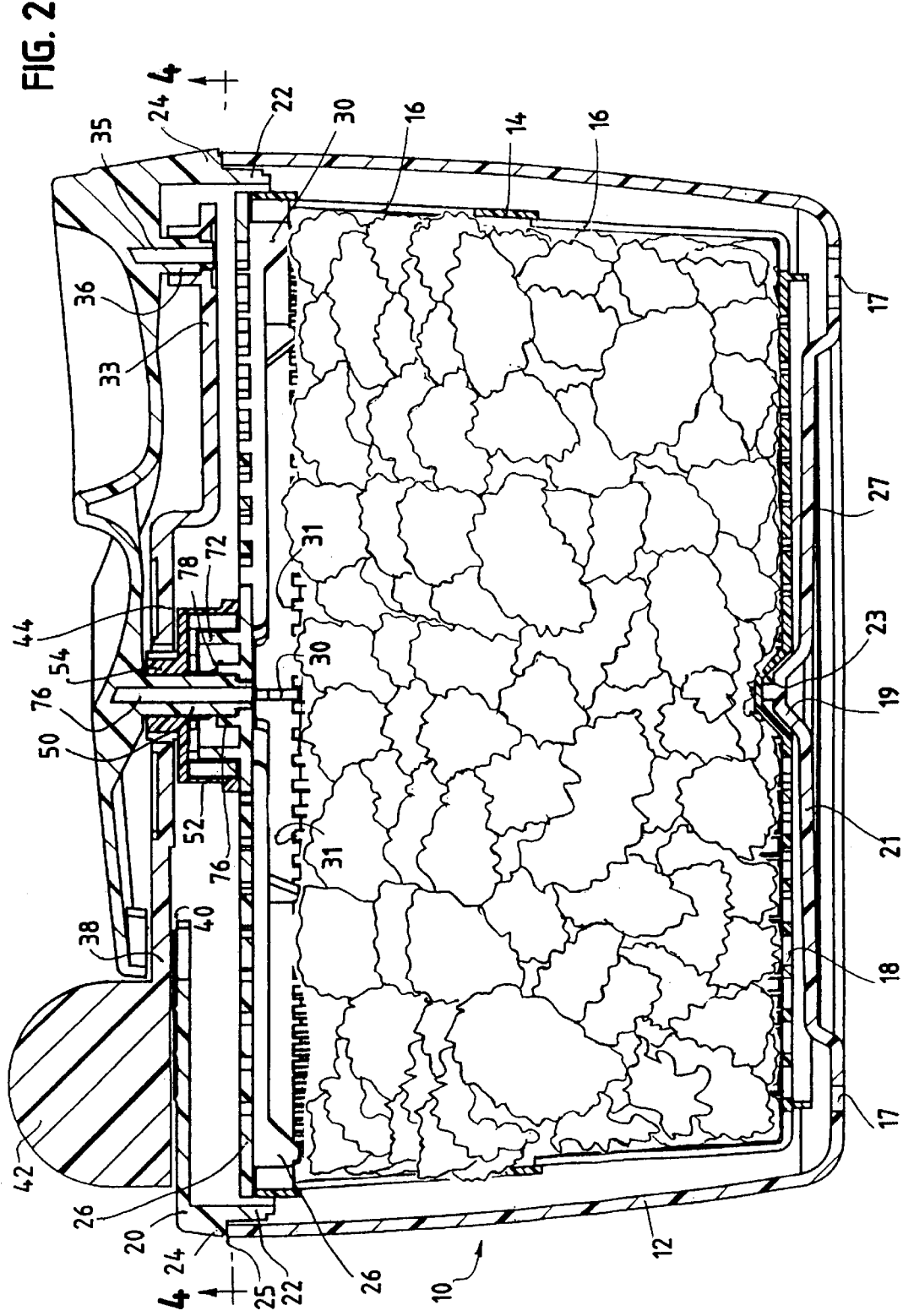
FIG. 2 is a vertical cross-sectional view of the salad spinner taken about the line 2—2 of FIG. 1.
Figure 3:
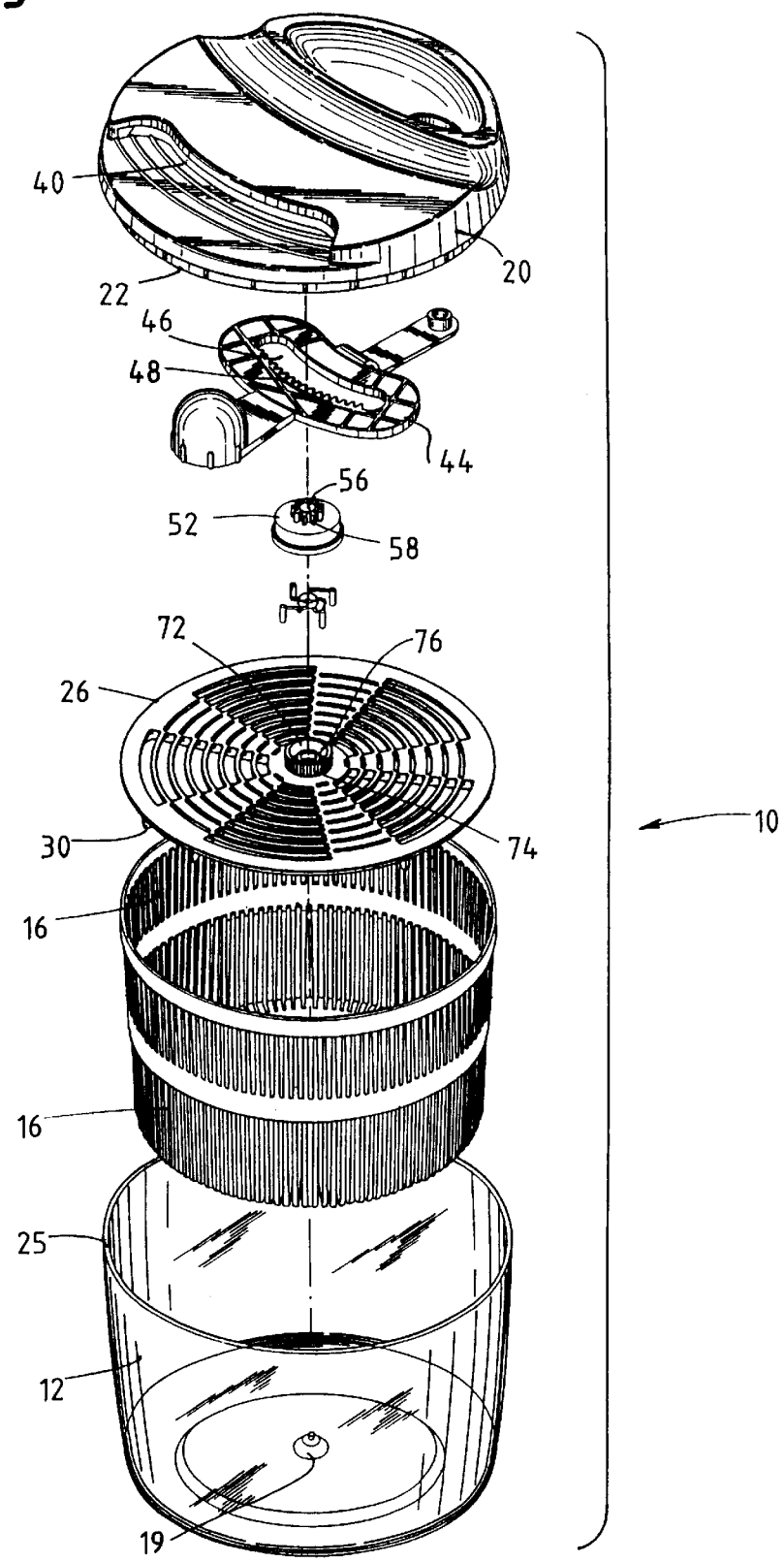
FIG. 3 is an exploded view of the salad spinner.

FIGS. 1–3 illustrate a salad spinner 10 which includes a transparent bowl 12 and a colander 14. The bowl 12 has a solid side wall construction while a plurality of perforations 16 are defined by the side walls of the colander with additional perforations 18 being defined by the bottom wall of the colander. Openings 17 are formed in the bottom wall of the bowl for drainage purposes.

A protrusion 19 extends upwardly from the bottom wall surface 21 of the bowl 12. A corresponding shaped recess 23 is defined by the bottom wall 27 of colander 14 so that these elements interfit while permitting rotational movement of the colander relative to the bowl.

A lid 20 is adapted for interfitting relationship with the bowl 12. As best shown in FIG. 2, this lid includes a downwardly extending flange 22 spaced inwardly of shoulder 24. The flange fits within the confines of the bowl while the shoulder is adapted to rest on the top edge 25 of the bowl.

The turret 26 defines a plurality of drive tabs 30. As best shown in FIG. 2, when the lid 20 is placed over the bowl and colander, these drive tabs fit between the upper ends of respective pairs of vertical nibs 31 which define the perforations 16 defined by the colander. Accordingly, rotation of the turret will automatically result in spinning movement of the colander relative to the bowl.

A drive handle 32 has one end 33 pivotally attached to the underside of lid 20 by means of fastener 35 fixed within the post 36 formed in the lid. The opposite end 38 of the handle extends outwardly from an elongated opening 40 defined by the lid, and a knob 42 is supported at the exposed end of the handle for engagement during use of the spinner.

The enlarged intermediate section 44 of the handle defines an arcuate slot 46 having ratchet teeth 48 along one side edge (FIGS. 3, 4 and 6). A post 50 is formed integrally with and extends downwardly from the lid. Clutch housing 52 includes a central tubular section 54 which defines opening 56 for receiving post 50. The housing 52 is freely rotatable about the post. Pinion gear teeth 58 are formed on the tubular section 54 for engagement with the ratchet teeth 48.

Figure 3A:
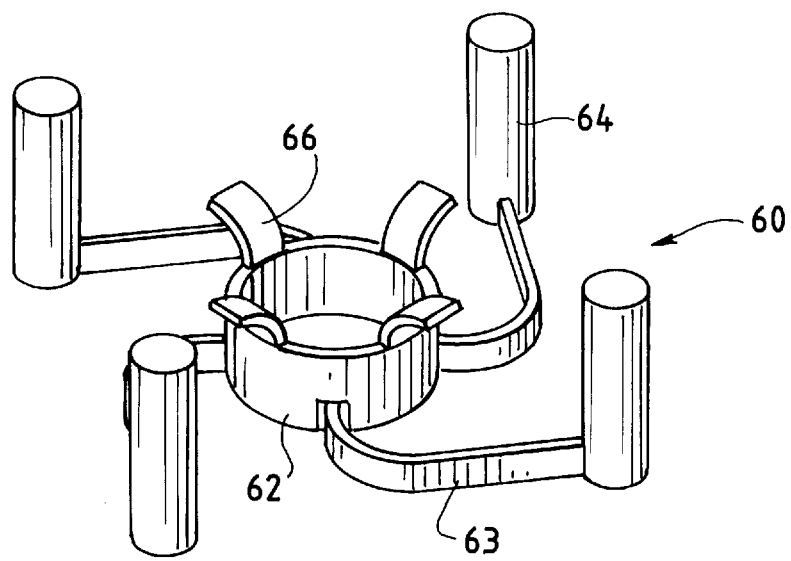
FIG. 3A is a perspective view of a clutch structure used in the salad spinner shown upside down.
Figure 3B:
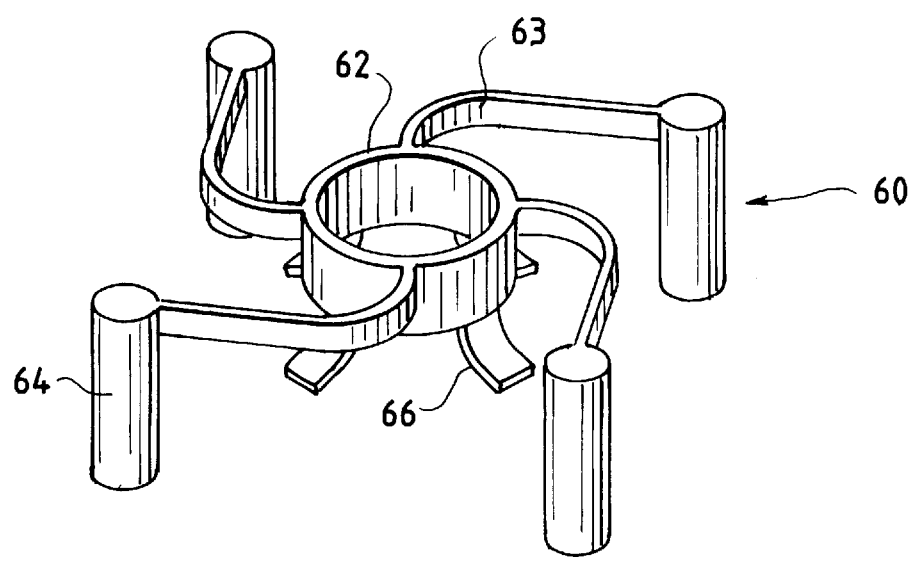
FIG. 3B is a perspective view of the clutch structure shown in the operating position.

A clutch assembly 60 is provided for positioning within the housing 52. This assembly, as particularly shown in FIGS. 3A and 3B, comprises a central hub 62, outwardly extending flexible arms 63, pins 64 attached at the ends of the arms, and tensioning petals 66 extending, when in the operating position shown in FIG. 3B, downwardly and outwardly relative to the central hub. The axis of each pin 64 is substantially parallel to the axis of central hub 62.

The interior wall surface of the housing 52 defines recesses 70 for receiving pins 64 (FIGS. 5 and 7). The turret 26 supports a hub 72 on its top surface. A central opening defined by this hub receives post 50 and, in turn, fastener 76 has a threaded end receivable within the threaded interior of post 50. The fastener thus serves to hold the turret 26 and clutch housing in assembly relative to the lid 20 while permitting rotation of the turret and housing about the post.

The hub 72 of turret 26 defines a vertically serrated surface 74 for engagement by pins 64 of the clutch assembly 60. In this regard, the clutch assembly has distinct advantages when compared with prior art clutch drives as illustrated, for example, in the aforementioned U.S. Pat. No. 5,562,025. Thus, as with the other components of the salad spinner of this invention, plastic, such as ABS, is molded to form the assembly. This one-piece construction greatly facilitates location of the pins 64 within the respective recesses 70 of housing 52 during assembly operations.

The interior of hub 72 defines a concentric tubular section 76 having an upper end surface 78 for engagement with the tensioning petals 66. This engagement is sufficient upon assembly of the components to provide resistance against rotation of the clutch assembly from the position shown in FIG. 5 as the clutch housing begins movement counterclockwise in response to movement of handle 32. Due to this resistance and the flex provided by arms 63, the recesses 70 thereby move the pins inwardly relative to serrated surface 74 to insure driving engagement with the turret 26.

When the handle movement is reversed, the pins are moved to the outermost positions in recesses 70, out of engagement with the serrated surface so that the turret driving action is disengaged (FIG. 5). Reversal of the handle movement reengages the driving action, and so on, so that the turret and colander always spin in one direction.

It will be apparent that the clutch assembly of the invention has utility beyond a salad spinner. Thus, the clutch housing could be driven by a variety of means and the driving force of the clutch assembly 60 could then be imparted to a variety of means. In a simple application, a child's toy could be constructed with the clutch assembly interposed between parts which are relatively movable in the fashion of the illustrated salad spinner.

It will be understood that various changes and modifications may be made in the structures of the invention without departing from the spirit of the invention particularly as defined in the following claims.

The invention claimed is:

1. A salad spinner comprising a bowl, a colander adapted to rest within the bowl, a lid for said bowl and colander, and drive means associated with said lid and operatively connected to said colander for rotating the colander relative to the bowl, the drive means including a handle having one end for manual engagement and an opposite end pivotally attached to the lid, a drive gear associated with said handle, a turret positioned on the underside of said lid, means rotatably attaching said turret to said lid, means carried by said turret for engaging said colander to impart spinning movement thereto, a pinion gear in driving engagement with said turret, said pinion gear meshing with said drive gear, and clutch means interposed between said pinion gear and said turret, whereby movement of said handle in one direction engages the clutch means to transmit movement to the turret for spinning of the colander in one direction, and movement of the handle in the opposite direction disengages the clutch means, said clutch means comprising a clutch housing, a clutch assembly receivable within the clutch housing, said clutch assembly including, a central hub, a plurality of drive pins, flexible arms connecting the drive pins to the central hub, and tensioning petals attached to the central hub for engagement with said turret, recesses defined by said clutch housing for receiving said drive pins, said recesses sloping radially inwardly toward said central hub, an engagement surface defined by said turret for receipt within said clutch housing, said petals operating to urge said pins inwardly along said recesses and into driving engagement with said engagement surface when said handle is moved in said one direction, and outwardly along said recesses and out of driving engagement when said handle is moved in said opposite direction.

2. A salad spinner according to claim 1 wherein said clutch assembly is a one-piece molded construction.

3. A salad spinner according to claim 2 wherein said clutch assembly defines four flexible arms extending radially outwardly for the top edge of said central hub, a pin at the end of each arm, the axis of each pin extending in substantially parallel relationship with the axis of the central hub and downwardly relative to the central hub, and four petals extending radially outwardly from the bottom edge of said central hub.

4. A salad spinner according to claim 3 wherein said engagement surface of said turret comprises a serrated surface.

5. A salad spinner according to claim 4 including central hub formed on said turret and receivable within said clutch housing, said serrated surface being defined by said central hub of said turret.

6. A salad spinner according to claim 5 including a concentric tubular section located within said central hub of said turret, said tubular section defining a top edge pressing against said petals to provide resistance to movement of said clutch assembly when said handle is moved in said one direction.

7. A salad spinner according to claim 1 including an intermediate section formed in said handle, said intermediate section extending outwardly on either side of the handle, an elongated central opening defined by the intermediate section, said pinion being receivable within said opening, at least one side edge of said opening defining ratchet teeth for engagement with said pinion.

8. A salad spinner comprising a bowl, a colander adapted to rest within the bowl, a lid for said bowl and colander, and drive means associated with said lid and operatively connected to said colander for rotating the colander relative to the bowl, the drive means including a handle having one end for manual engagement and an opposite end pivotally attached to the lid, a drive gear associated with said handle, a turret positioned on the underside of said lid, means rotatably attaching said turret to said lid, means carried by said turret for engaging said colander to impart spinning movement thereto, a pinion gear in driving engagement with said turret, said pinion gear meshing with said drive gear, and clutch means interposed between said pinion gear and said turret, whereby movement of said handle in one direction engages the clutch means to transmit movement to the turret for spinning of the colander in one direction, and movement of the handle in the opposite direction disengages the clutch means, said handle including an intermediate section, said intermediate section extending outwardly on either side of the handle, an elongated central opening defined by the intermediate section, said pinion being receivable within said opening, at least one side edge of said opening defining ratchet teeth for engagement with said pinion.

9. A clutch means for imparting driving force to a rotatable part in response to a driving force applied to the clutch means, said clutch means comprising a clutch housing, and a clutch assembly receivable within the clutch housing, said clutch assembly including, a central hub, a plurality of drive pins, flexible arms connecting the drive pins to the central hub, and tensioning petals attached to the central hub for engagement with said rotatable part, and recesses defined by said clutch housing for receiving said drive pins, said recesses sloping radially inwardly toward said central hub, an engagement surface defined by said rotatable part for receipt within said clutch housing, said petals operating to urge said pins inwardly along said recesses and into driving engagement with said engagement surface when said driving force is applied, and outwardly along said recesses and out of driving engagement when said driving force is removed.

10. A clutch mean according to claim 9 wherein said clutch assembly is a one-piece molded construction.

11. A clutch mean according to claim 10 wherein said clutch assembly defines four flexible arms extending radially outwardly for the top edge of said central hub, a pin at the end of each arm, the axis of each pin extending in substantially parallel relationship with the axis of the central hub and downwardly relative to the central hub, and four petals extending radially outwardly from the bottom edge of said central hub.

12. A clutch means according to claim 11 wherein said engagement surface of said rotatable part comprises a serrated surface.

13. A clutch means according to claim 12 including a central hub formed on said rotatable part and receivable within said clutch housing, said serrated surface being defined by said central hub of said rotatable part.

14. A clutch means according to claim 13 including a handle moveable in one direction for applying said driving force, a concentric tubular section located within said central hub of said rotatable part, said tubular section defining a top edge pressing against said petals to provide resistance to movement of said clutch assembly when said handle is moved in said one direction.

* * * * *